INVENTOR.
DONALD I. MALM

INVENTOR.
DONALD I. MALM

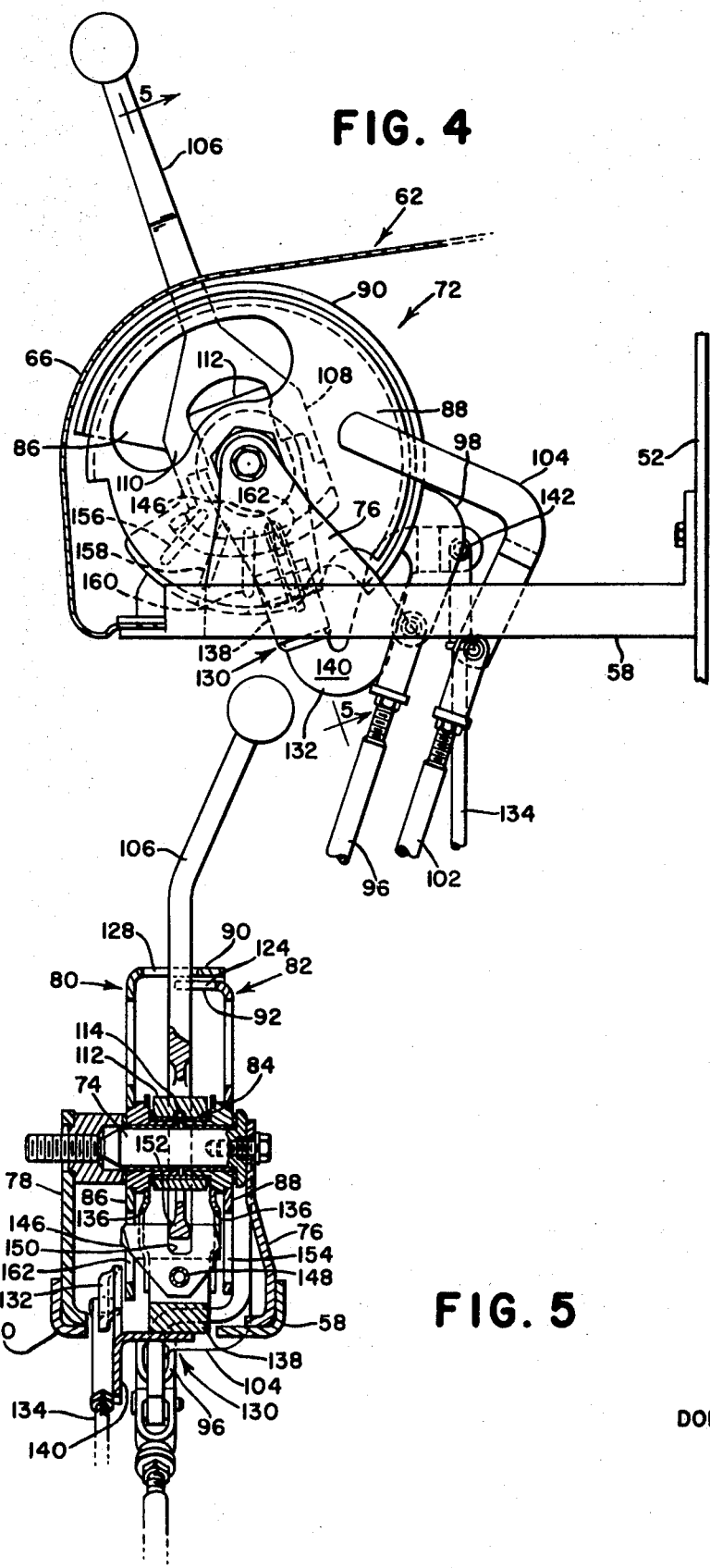

United States Patent Office
3,616,709
Patented Nov. 2, 1971

3,616,709
TRANSMISSION CONTROL MECHANISM FOR A TRACTOR HAVING A RESILIENTLY-MOUNTED CONTROL CONSOLE
Donald Irwin Malm, Cedar Falls, Iowa, assignor to Deere & Company, Moline, Ill.
Filed Apr. 14, 1970, Ser. No. 28,327
Int. Cl. G05g 9/00
U.S. Cl. 74—473 R                5 Claims

ABSTRACT OF THE DISCLOSURE

A tractor is provided with an operator's station including a platform, seat, and control console which are secured as a unit to the tractor chassis by resilient mount assemblies which provide vibration isolation and permit limited vertical movement of the operator's station relative to the tractor chassis. A transmission speed and range control mechanism for selectively establishing desired conditions in the transmission is fixed to the control console and includes speed and range selector drums selectively pivotally mounted for rocking about a common axis, which drums have rigid links connected thereto and to transmission shift elements fixed to the chassis. To prevent the transmission from being shifted due to relative movement between the operator's station and the tractor chassis, a compensator linkage is connected between the chassis and selector drums in such a way as to guarantee that no movement is imparted to the rigid links connecting the selector drums to the transmission shift elements.

BACKGROUND OF THE INVENTION

This invention relates to a tractor having a resiliently-mounted operator's station permitting relative movement between control elements carried by the station and controlled elements integral with the tractor chassis. More specifically, this invention relates to a compensator linkage adapted for use with a transmission control mechanism of the type disclosed in assignee's abandoned application, Ser. No. 653,454, for preventing shifting of the tractor transmission by relative movement between the operator's station, which contains the transmission controls, and the chassis which carries the transmission mechanism.

The above-mentioned abandoned application discloses transmission controls mounted on a control console, which is fixed to the tractor chassis, for controlling transmission mechanism of the type shown in assignee's U.S. Patent 2,775,134 to Swenson, which transmission mechanism includes a plurality of speed ratios and a pair of range ratios by means of which the speed ratios may be doubled. The transmission controls include a speed selector drum and a range selector drum which are coaxially mounted and are selectively rockable by a single shift lever to, via rigid shift links pivotally connected between the selector drums and transmission mechanism, establish desired conditions in the transmission mechanism. Successful operation of the transmission mechanism is dependent upon the rigid linkage between the selector drums and the transmission mechanism and upon selective positioning of the drums relative to each other. The latter end is achieved by a locking pawl which is pivotally connected to the control console frame and which is shifted in response to the shift lever to lockingly engage either selector drum when the lever is moved into position for rocking the other selector drum.

The rigid linkage between the selector drums and the transmission mechanism, which is so important to the successful operation of the transmission, has an inherent drawback when used on a tractor that has a resiliently-mounted operator's platform, since vertical movement of the control console relative to the tractor chassis is transferred to the rigid linkage and may cause unwanted shifting of the transmission.

SUMMARY OF THE INVENTION

According to the present invention, there is provided a novel linkage for use with tractor control elements, which are mounted for uncontrolled movement relative to controlled elements, for compensating for the uncontrolled movement, thus permitting rigid linkage to be interconnected between the control and controlled elements. More specifically, there is provided a linkage for use with a tractor wherein the control elements include a transmission control mechanism mounted for movement with a resiliently-mounted operator's station, and the controlled elements include transmission mechanism fixed to the tractor chassis.

An object of the invention is to provide a linkage which preserves necessary rigidity between control and controlled elements while compensating for uncontrolled relative movement between the control and controlled elements.

A more specific object is to provide a linkage for use with a transmission control that is fixed for movement with an operator's station which is resiliently-mounted on the tractor chassis to which the transmission mechanism is secured.

Another specific object is to provide such a linkage in a transmission control of a known type, including transmission speed and range selector drums coaxially mounted for selective rocking by a single lever, and a locking pawl responsive to the lever for lockingly engaging either selector drum when the lever is positioned to rock the other selector drum.

Still another object is to provide such a compensator linkage which incorporates the locking pawl.

These and other objects will be apparent from the ensuing description and appended drawings.

BRIEF DESCRIPTION OF THE DRAWINGS

FIG. 4 is an enlarged side elevational view of the selector drums and linkages shown in FIG. 2.

FIG. 5 is a sectional view taken along line 5—5 of FIG. 4.

DESCRIPTION OF THE PREFERRED EMBODIMENT

Figure 1:
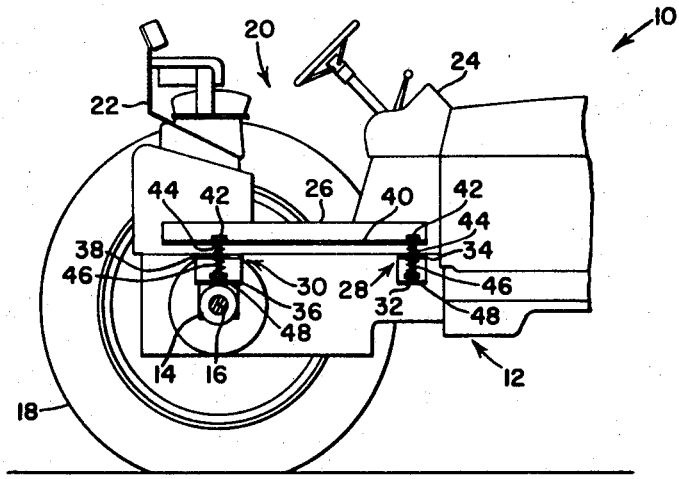
FIG. 1 is a side elevational view of a tractor embodying the invention.

Referring now to FIG. 1, there is shown a rearward right side portion of a tractor 10. It is to be understood that the left side of the tractor may be assumed to be substantially identical to the right side for the purposes of the present invention, and that such identical parts will hereinafter be referred to as being in pairs, although only one of each pair is shown. The tractor 10 has a chassis 12 including a pair of oppositely extending rear axle housings 14 in which are respectively received a pair of axles 16 having a pair of drive wheels 18 mounted thereon.

A unitary operator's station 20, including a seat structure 22 interconnected with a control console 24 by a platform 26, is resiliently or flexibly mounted on the chassis 12 by a front pair of resilient mount assemblies 28 located at opposite sides of the control console 24 and by a rear pair of resilient mount assemblies 30 positioned over the axle housings 14. The front mount assemblies 28 include a pair of support brackets 32 respectively secured to the opposite sides of the chassis 12 and having horizontal legs 34. The rear mount assemblies 30 are substantially identical to the front mount assemblies, and specifically include a pair of support brackets 36 secured to the axle housings 14 and having horizontal legs 38. The platform 26 includes a pair of oppositely-extending flanges 40 which respectively overlie one of each of the pairs of brackets 32 and 36 and are secured thereto by bolts 42 which extend through aligned apertures in the flanges 40 and the horizontal legs 34 and 38. The bolts 42 further serve to mount upper and lower coil springs 44 and 46, respectively, on opposite sides of the horizontal legs 34 and 38, the upper coil springs 44 engaging the flange 40 and supporting the weight of the operator's station 20 and the lower coil springs 46 being held on the bolts 42 by nuts 48.

It is to be understood that the connections between the seat structure 22 and the control console 24, and between the operator's station 20 and the chassis 12 are illustrated in a schematic nature intended only to convey the idea that the operator's station 20 is resiliently or flexibly supported on the chassis 12 for limited movement relative thereto. A more practical mode of mounting an operator's station on a tractor chassis is disclosed in copending application Ser. No. 28,328, filed on an even date with and having an assignee common to that of the instant application.

The control console 24 is best illustrated in FIGS. 2–5 and includes a housing 50 having forward and rearward planar walls 52 and 64 joined by a floor 56 and by a pair of laterally-spaced fore-and-aft extending angle members 58 and 60. Supported in the housing 50 are various tractor controls, many of which have been omitted for clarity. Shown connected to the housing 50 is a top cover 62 including a forward dash portion 64 and an arcuate rear portion 66. A steering column 68 having the steering wheel 70 at its upper end projects through the cover 62 and is fixed at its lower end to the housing 50 by means (not shown). A transmission control mechanism 72 is supported on the angle members 58 and 60.

The control mechanism 72 is similar to that disclosed in the afore-mentioned abandoned application and includes a transverse shaft 74 having its opposite ends fastened to a pair of vertical plates 76 and 78 that are respectively secured to the angle members 58 and 60. Mounted for selective fore-and-aft rocking on the shaft 74 are transmission speed and range selector drums 80 and 82 which are held axially apart by a sleeve-like spacer 84. The selector drums 80 and 82 are generally circular in side view, and include respective vertical outer plate portions 86 and 88, and axially, inwardly-extending, overlapping rim segments 90 and 92. Rocking movement of the speed selector drum 80 is transmitted to a transmission shift element 94 via a shift link 96 respectively, pivotally connected at its opposite ends to the lever 94 and to an arm 98 fixed to the rim segment 90. Similarly, rocking movement of the range selector drum 82 is transmitted to a transmission shift element 100 via a shift link 102 respectively pivotally connected at its opposite ends to the lever 100 and to an arm 104 fixed to the plate portion 88. The shift elements 94 and 100 are operatively connected to a transmission mechanism (not shown) of the type disclosed in assignee's above-mentioned U.S. Patent 2,775,134 to Swenson. The details of the transmission are not material here, except in a representative sense it is a transmission of the type having a plurality of speed ratios and a pair of range ratios by means of which the speed ratios may be doubled.

Selective rocking of the speed and range selector drums 80 and 82 is effected by structure including a manually-operable shift lever 106. The lever 106 is bifurcated at its lower end having fore-and-aft aligned legs 108 and 110 straddling a block 112, which block is pivotally mounted on the spacer 84 between the selector drums 80 and 82. The lever 106 is pivotally connected to the block 112 by a pin 114 extending through the legs 108 and 110. Thus, it can be seen that the lever 106 is mounted for fore-and-aft rocking about the axis of the transverse shaft 74 and is mounted for sideways rocking about the axis of the pin 114.

Coordination of selective angular positioning of the speed and selector drums 80 and 82 by the lever 106 to establish desired speed and range ratios in the transmission is accomplished by an irregular opening 116 in the rim segment 90 of the speed selector drum 80 and by four selector notches 118, 120, 122, and 124 in the marginal portion of the rim segment 92 of the range selector drum 82. The opening 116 includes a neutral positioning notch 126 in the marginal outer portion of the rim segment 90, which notch opens laterally into the upper leg (as viewed in FIG. 3) of a fore-and-aft extending zigzag-shaped guide slot 128. The lever 106 is received in the slot 116 and is shiftable, when in the notch 126, to rock the selector drum 80 to positions wherein the lever is aligned with and sideways rockable into respective ones of the notches 118, 120, 122, and 124. The notches respectively register with four basic positions of the lever 106 which correspond to four range-speed conditions available in the transmission; namely, 1–3-R, 2–5-R, 4–7, and 6–8, which conditions are indicated by indicia appearing on the control console cover 62 alongside the path of fore-and-aft movement of the lever 106. Once the lever 106 is in one of the notches 118 through 124, the selector drum 82 may be rocked fore-and-aft to three alternate positions defined by the opposite ends of, and the crossover portion of, the zigzag-shaped guide slot 128.

Successful shifting of the the transmission is based upon an accurate correspondence of the positions of the speed and range selector drums 80 and 82 relative to each other, and upon a fixed relationship being maintained between the selector drums and the shift links 96 and 102 once a selected operational condition is established. These ends are accomplished by a combined locking mechanism and compensator linkage 130 for locking either of the selector drums 80 and 82 in response to the shift lever 106 in position for rocking the other of the selector drums, and for compensating for relative movement between the operator's station 20 and the chassis 12. Specifically, the combined locking mechanism and compensator linkage 130 includes a lock-carry link 132 and a compensator rod 134. The inner end of the link 132 includes a pair of space plates 136 pivotally connected for angular movement about and extending downwardly from the transverse shaft 74 between the selector drums 80 and 82 and having a bifurcated block 138 fixed between the lower ends thereof. The outer end of the link 132 includes a strap 140 fixed to and extending first laterally, then downwardly, then upwardly, then forwardly from the block 138. The forward end of the strap 140 is pivotally connected at 142 to the upper end of the compensator rod 134, the lower end of the rod 134 being anchored to the chassis 12 via a pivotal connection 144. It is important to note, for reasons given below, that the pivotal connection 142 lies on a common radius with the pivotal connection between the arm 98 of the speed selector drum 80 and the shift link 96.

Figure 3:
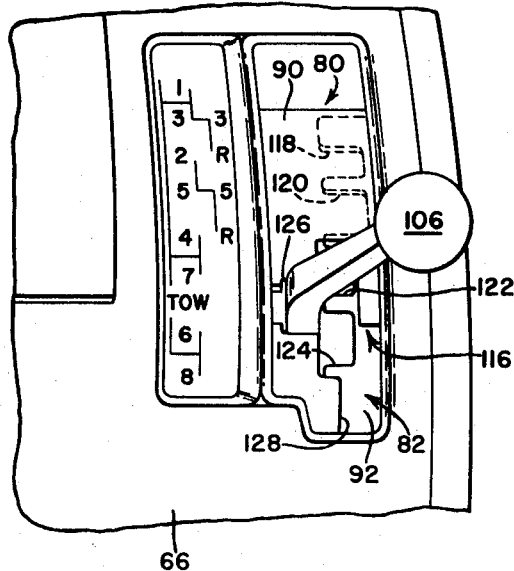
FIG. 3 is a top perspective view of a portion of the control console showing the shift lever and selector drums.
Figure 2:
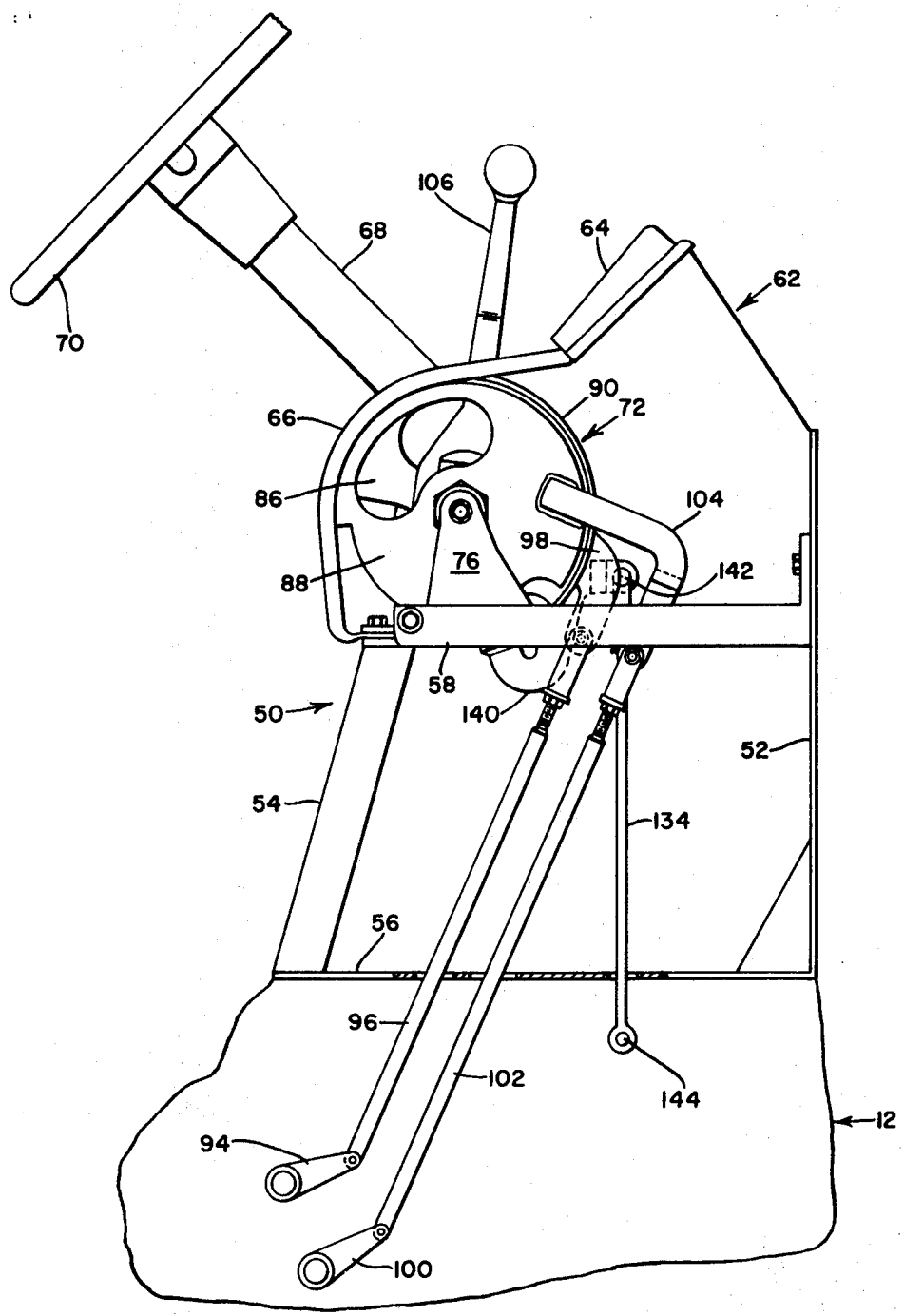
FIG. 2 is a side elevational view of the control console with parts removed exposing the speed and range selector drums and their linkages and the compensator linkage.

A locking pawl 146 is pivoted at 148 to the block 138 for side-to-side rocking movement. The pawl has an upwardly-opening notch 150 in which is received an arcuate member 152 joining the bottoms of the legs 108 and 110 of the lever 106. When the lever 106 is rocked sideways into the neutral positioning notch 126, as shown in FIG. 3, the arcuate member 152 effectuates sideways rocking of the pawl 146 to engage it in a slot 154 in the range selector drum plate portion 88. Similarly, when the lever 106 is rocked sideways into one of the notches 118, 120, 122, and 124, in the range selector drum 82, the arcuate member 152 effectuates sideways rocking of the pawl 146 to engage it respectively in slots 156, 158, 160, and 162 in the speed selector drum plate portion 86.

It is important to note that the tractor transmission is in its neutral condition and the tractor is normally at rest when the shift lever 106 is positioned in the notch 126, as illustrated in FIG. 3. In this case, there is no relative vertical movement between the control console 24 and the tractor chassis 12, and the compensator rod 134 serves only to fix the position of the lock-carry link 132 which acts via the pawl 146 to prevent the range selector drum 82 from rotating and rocking about the transverse shaft 74. However, when the lever 106 is positioned in one of the four selector notches 118 through 124, and is at one of the permissible operative positions in the zigzag-shaped slot 128, the transmission will be engaged to put the tractor in motion. In this case, there is a possibility of relative motion between the control console 24 and the chassis 12, and if such motion should occur, the compensator rod 134 will cause the speed selector drum 80, which is now locked to the link 132, to rock about the shaft 74 with the link 132. Since the pivotal connection between the link 132 and the compensator link 134 is located on a common radius with the pivotal connection between the speed selector drum 80 and the shift link 96, the shift link 96 will remain undisturbed and unwanted shifting of the transmission will be avoided.

It is also important to note that the resistance to rotation offered by the transmission shift element 100 is sufficient, when transmitted through the shift link 102 to overcome resistance of the range selector drum 82 to rotation. Therefore, the shift link 102 will transmit relative movement between the control console 24 and the tractor chassis to rotate the selector drum 82 about the shaft 74, and thus remain undisturbed during such relative movement.

I claim:

1. In a tractor of the type having a control console mounted for movement relative to the tractor chassis, a control mechanism for selectively positioning at least one element operatively mounted in the chassis, comprising: selector means pivotally mounted on said control console for angular movement to predetermined selected positions; rigid link means pivotally interconnected between said selector means and said element for positioning said element at desired positions corresponding to said predetermined positions of said selector means; lock means pivotally mounted on said control console for movement paralleling that of said selector means, said lock means being operative for selectively locking said selector means in said predetermined positions; and compensator means pivotally interconnected between said lock means and a fixed point on said chassis and having connections so related to those of said rigid link means that the lock means and locked selector means will be rotated an amount sufficient to leave said rigid link means substantially undisturbed when relative movement between the control console and tractor chassis is experienced.

2. The invention defined in claim 1 wherein said lock means and said selector means are coaxially mounted and wherein said compensator means includes a rod pivotally interconnected between said lock means and said point on the chassis and said pivotal connection with said lock means being on a common radius with the pivotal connection between the selector means and the rigid link means.

3. The invention defined in claim 2 and further including a shaft fixed to said control console and said lock means and said selector means being mounted for independent pivoting about said shaft.

4. In a tractor of the type having a control console mounted for movement relative to the tractor chassis, a control mechanism for controlling transmission mechanism operatively mounted in the chassis, comprising: first and second selector drums coaxially pivotally mounted on said control console for independent rocking movement; first and second rigid shift links respectively pivotally interconnected between said first and second selector drums and said transmission mechanism; a shift lever operatively mounted for selective engagement with either of said selector drums and for rocking the engaged selector drum; combined locking and compensator means for locking either selector drum at predetermined selected positions in response to said shift lever being engaged with the other selector drum and for preventing disturbance of said shift links when relative movement between the control console and the chassis is experienced, said means including a lock-carrying link and a compensator rod pivotally interconnected at one of their ends and having their other ends respectively pivotally connected to said control console and to an anchor pin fixed to said chassis; locking means carried by said lock-carrying link for locking either of said selector drums in response to said lever being engaged to rock the other selector drum; and said pivot connections of said rigid link, said lock-carrying link and said compensator rod being related such that the lock-carrying link and the locked one of said selector drums will be pivoted in unison by said compensator rod to leave the associated rigid shift link undistrubed when there is relative movement between the control console and the chassis.

5. The invention defined in claim 4 wherein the selector drums, the shift lever and the lock-carrying link are all mounted for rotation about a common axis and wherein the pivotal connection between one of said selector drums and one of said rigid links lie on a common radius with the pivotal connection between said lock-carrying link and said compensator rod.

References Cited

UNITED STATES PATENTS 3,250,145    5/1966    Harper _____ 74—473

MILTON KAUFMAN, Primary Examiner

U.S. Cl. X.R.

180—77 R